Dec. 31, 1929. K. E. LYMAN ET AL 1,741,854
AUTOMATIC TRANSMISSION
Filed July 9, 1928  3 Sheets-Sheet 2
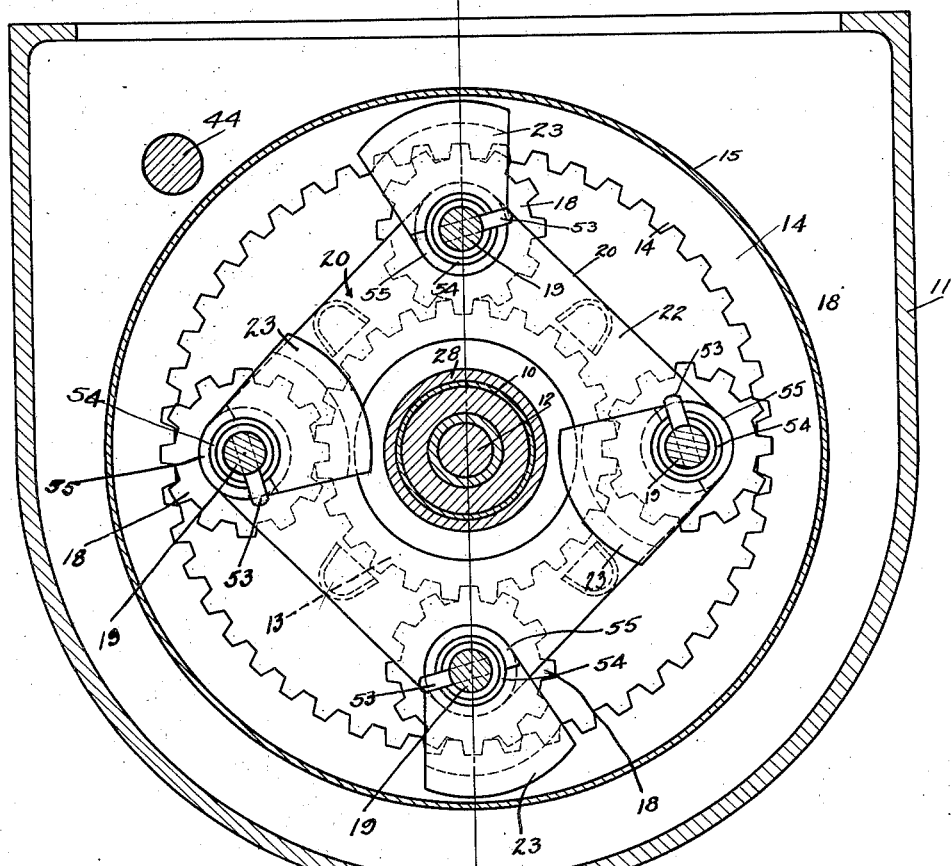
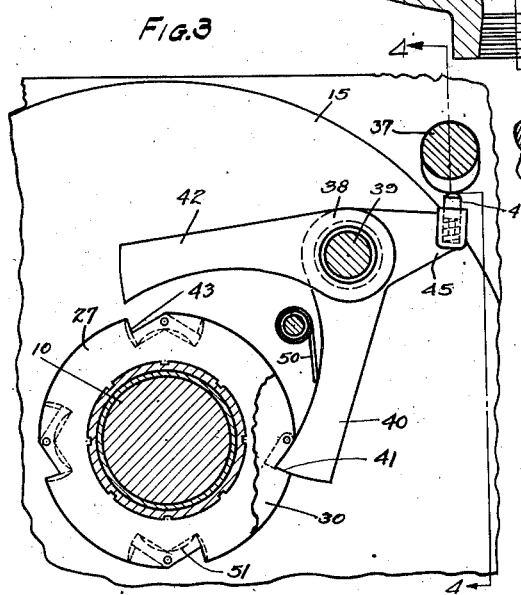
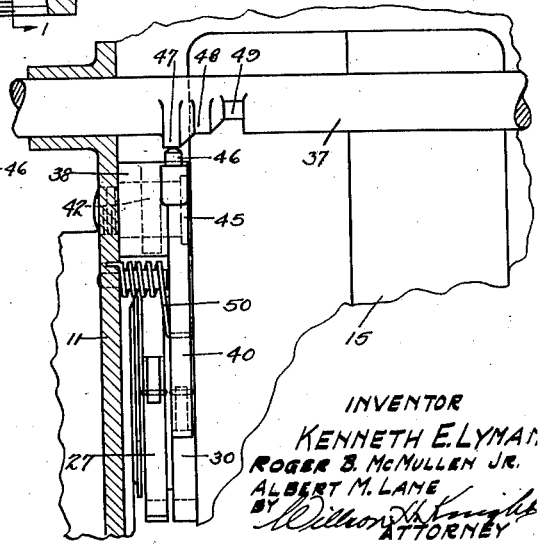
INVENTOR
KENNETH E. LYMAN
ROGER B. McMULLEN JR.
ALBERT M. LANE
BY *William H. Knight*
ATTORNEY Dec. 31, 1929.  K. E. LYMAN ET AL  1,741,854
AUTOMATIC TRANSMISSION
Filed July 9, 1928   3 Sheets-Sheet 3
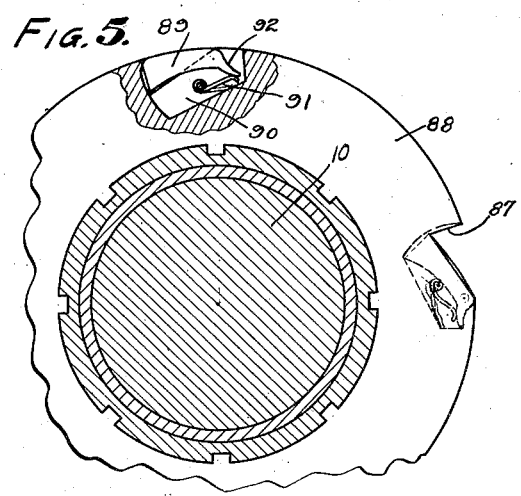
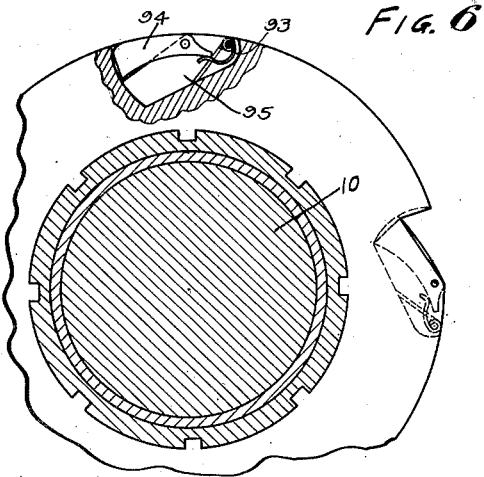
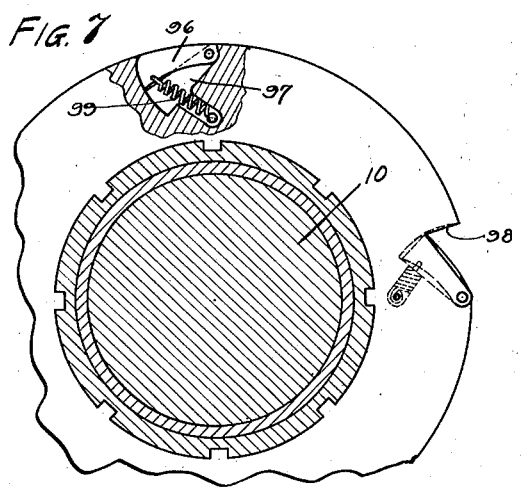
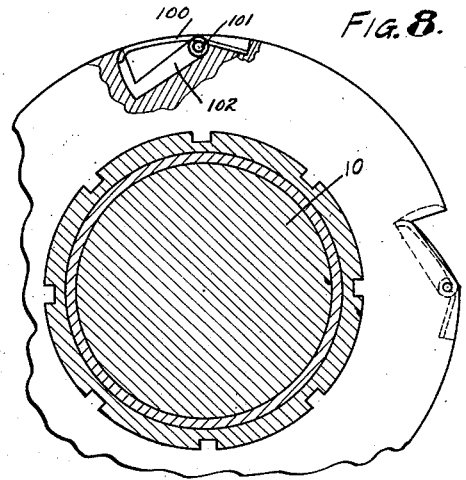
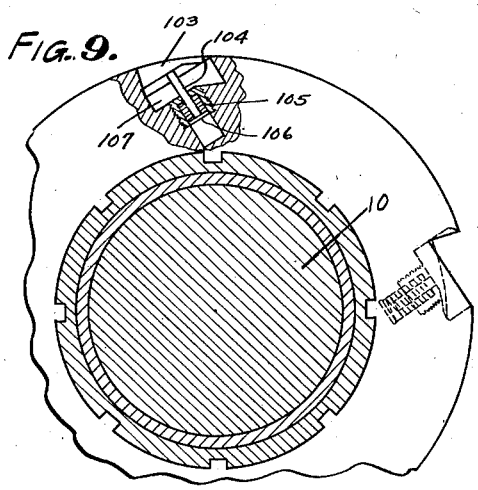
INVENTORS
KENNETH E. LYMAN
ROGER B. McMULLEN JR.
ALBERT M. LANE
BY
ATTORNEY Patented Dec. 31, 1929

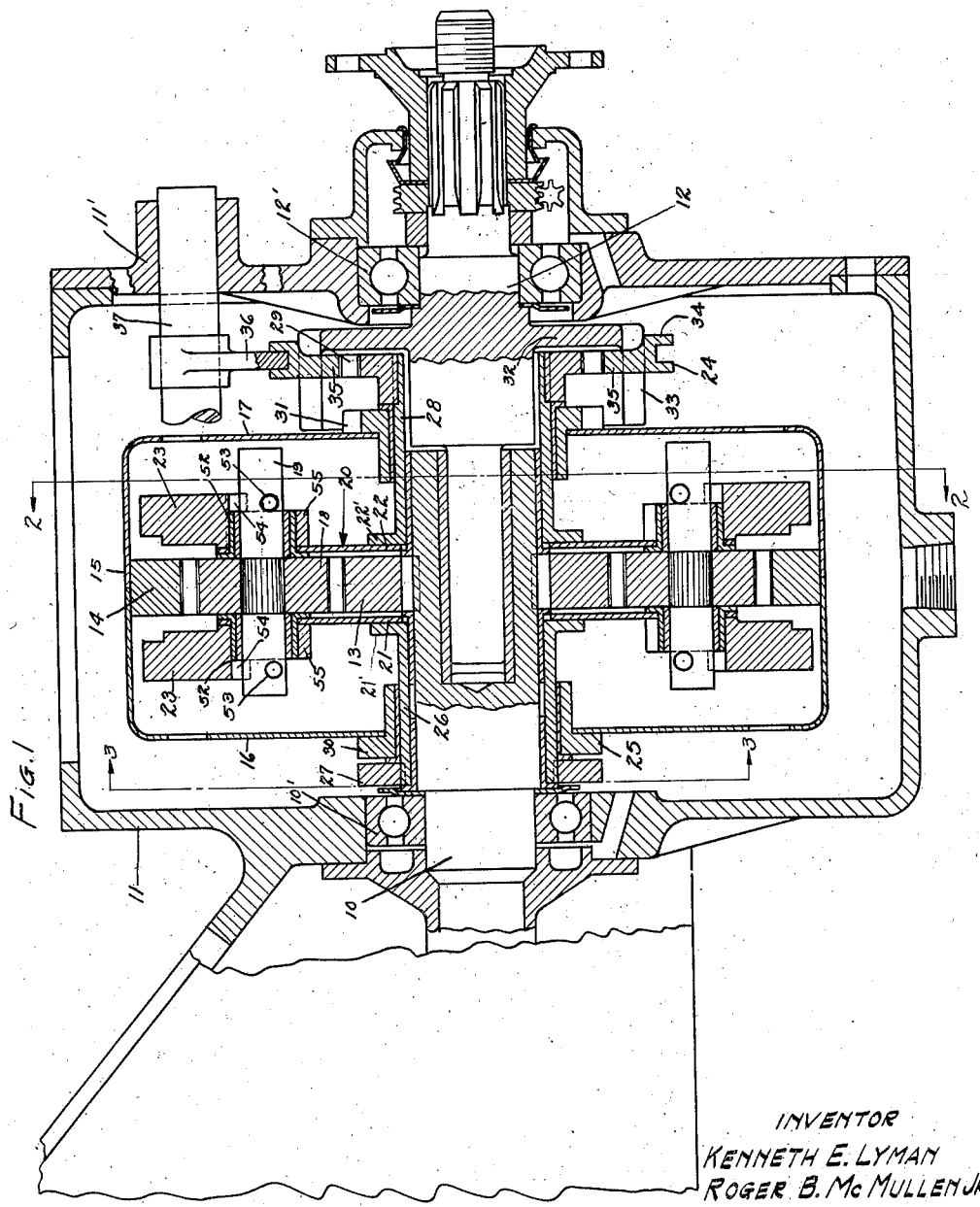

1,741,854

UNITED STATES PATENT OFFICE

KENNETH E. LYMAN, OF ROCKFORD, ROGER B. McMULLEN, JR., OF EVANSTON, AND ALBERT M. LANE, OF ROCKFORD, ILLINOIS, ASSIGNORS TO AUTOMATIC TRANSMISSION COMPANY, OF ROCKFORD, ILLINOIS, A CORPORATION OF ILLINOIS

AUTOMATIC TRANSMISSION

Application filed July 9, 1928. Serial No. 291,250.

The present invention relates in general to transmissions and has particular reference to an improved automatic transmission which, owing to its unusually effective construction and operation is well suited for, but not necessarily limited to motor vehicles.

While the foregoing statement is indicative in a general way of the nature of the invention, other objects and advantages will be apparent upon a full understanding of the construction, arrangement and operation of the improved transmission.

Several different forms of the invention are presented herein by way of exemplification, but it will of course be understood that the invention is susceptible of embodiment in still other structurally modified forms without departing from the spirit of the invention as defined in the sub-joined claims.

In the accompanying drawings:

Fig. 1 is a vertical longitudinal section through a transmission constructed in accordance with the invention;

Fig. 2 is a section, taken on the line 2—2 of Fig. 1;

Fig. 3 is a section, taken on the line 3—3 of Fig. 1;

Fig. 4 is a section, taken on the line 4—4 of Fig. 3; and Figs. 5 to 9 inclusive are sections corresponding to a portion of Fig. 3 showing various modifications of a portion of the back stop mechanism.

The transmission shown in the drawings is characterized by a driving shaft 10 which is journaled in a casing 11 by the bearing 10′ and is adapted to be connected with a power source, such as a motor, to rotate the same; a driven shaft 12 which is also journaled in the casing 11 by the bearing 12′ and is adapted to be connected with the propeller shaft of the vehicle or any other element to be driven depending upon the particular application of the transmission; a sun gear 13 is mounted on the driving shaft 10 in any suitable manner to rotate therewith; a ring gear 14 which is carried by a cage 15 having front and rear sections 16 and 17; a plurality of planet gears 18 which mesh with the sun and ring gears and are secured to planet shafts 19 which are journaled in a spider 20 having front and rear sections 21 and 22; weights 23 which are carried by the planet shafts 19; clutch mechanism 24 for connecting either the spider 20 or the cage 15 with the driven shaft, depending upon whether a forward or reverse drive is desired; and back-stop mechanism 25 for preventing either the cage 15 from turning backward or the spider 20 from turning forward, depending upon whether the transmission is set in forward or reverse.

The front section 21 of the spider is fastened to the radial flange 21′ on a sleeve 26 which is journaled on the driving shaft 10 and carries at its front end a ratchet wheel 27 which forms a part of the back-stop mechanism 25 above referred to. The rear section 22 of the spider is fastened to a radial flange 22′ on a sleeve 28 similar to the sleeve 26 and which is also journaled on the driving shaft for a part of its length and carries at its rear end a gear 29 which forms a part of the clutch mechanism 24. The front section 16 of the cage is fastened to the side of a ratchet wheel 30 which is journaled on the sleeve 26 in spaced confronting relation to the ratchet wheel 27 and also forms a part of the back-stop mechanism 25 above referred to. The rear section 17 of the cage is fastened to the side of a gear 31 which is journaled on the sleeve 28 in spaced confronting relation to the gear 29 and forms a part of the clutch mechanism 24 above referred to.

The clutch mechanism 24 includes—in addition to the gears 29 and 31—a flange 32 on the driven shaft which is cupped forwardly about the gears 29 and 31 and is provided with a plurality of axially extending guide slots 33. A collar 34 fits about the forwardly cupped portion of the flange 32 and is provided with clutch teeth 35 which extend inwardly through the slots 33 into engagement with either the teeth of the gear 29 or the teeth of the gear 31, depending upon the position of the collar. The collar is prevented by the slotted formation of the flange from rotating with respect to the same, but may be shifted axially.

When the collar 34 is shifted into the position shown in Fig. 1, the spider 20 is clutched to the driven shaft; when the collar is shifted forwardly far enough to bring the teeth 35 on the collar into engagement with the gear 31, the cage 15 is clutched to the driven shaft; and when the collar is shifted into an intermediate position, wherein the teeth 35 on the collar occupy a position out of engagement with both the gear 29 and the gear 31, neither the spider 20 nor the cage 15 will be clutched to the driven shaft, and the transmission will be in neutral position. The collar is shifted axially by means of a fork 36 which engages within a circumferentially extending groove in the collar and is carried by a manually shifted control rod 37 which projects into the casing 11 as at 11'.

The back-stop mechanism 25 includes, in addition to the ratchet wheels 27 and 30, a member 38 which is pivotally mounted on a stud 39. A pawl 40 which is formed on the member is designed to engage within any one of a number of recesses 41 in the ratchet wheel 30, whereby to prevent the ratchet wheel 30 from turning backward, and another pawl 42 which is formed on the member is designed to engage within any one of a number of recesses 43 in the ratchet wheel 27, but only when the pawl 40 is withdrawn from the ratchet wheel 30, whereby to prevent the ratchet wheel 27 from turning forward. The operation of the pawls 40 and 42 is controlled by the rod 37 which may be shifted axially into any one of three different positions. An arm 45 which is formed on the member 38 carries a spring-pressed plunger 46 which is adapted to engage with any one of three different cam surfaces 47, 48 and 49 on the rod 37.

When the rod 37 is shifted into the position shown in Fig. 4, the cam surface 47 on the rod acts through the plunger 46 and the arm 45 to swing the member 38 into a position wherein the pawl 40 will move into one of the recesses 41 in the ratchet wheel 30 and prevent the ratchet wheel 30, with the cage 15 and ring gear 14, from turning backward. Such is the position of the rod 37 when the clutch mechanism 24 is in the position shown in Fig. 1. When the rod 37 is shifted forwardly to bring the surface 49 into opposition with the plunger 46, the member 38 will be swung by a spring 50 into a position wherein the pawl 42 will move into one of the recesses 43 in the ratchet wheel 27, whereby to prevent the ratchet wheel 27, with the spider 20 and planet gears 18, from turning forward. When the rod 37 is shifted into an intermediate position wherein the surface 48 is in opposition to the plunger 46, the member 38 will be swung by the spring 50 into a position wherein both pawls are withdrawn from engagement with both ratchet wheels, which position corresponds to the intermediate or neutral position of the clutch mechanism.

The recesses 41 and 43 in the ratchet wheels 27 and 30 are provided with pivotally mounted closure members 51 which are adapted to swing outwardly under centrifugal force when the ratchet wheels rotate, whereby to close off the recesses and thus present to the pawls uninterrupted surfaces on which to ride when the transmission is operating in a one to one forward drive.

The weights 23 are arranged in pairs at opposite sides of the planet gears 18, and several spaced pairs operating in synchronism are preferably employed. The weights are pivotally mounted on bearing sleeves 52 carried by the two sections of the spider, and are rotated by means of pins 53 which project radially from the planet shafts through openings 54 in the pivoting portions 55 of the weights. The openings 54 are circumferentially elongated in order that the weights may have a free movement of approximately 180° with respect to the planet shafts.

When the planetary gearing is in motion, the pins 53 will engage with the ends of the openings 54 and will swing the weights inwardly against the centrifugal force acting on the weights, whereby to retard the planetary movement and tend to establish a one to one drive. As soon, however, as the weights pass their innermost positions, they will swing outwardly under centrifugal force, but their acceleration will not be communicated to the planet shafts because of the free movement of approximately 180° permitted by the pin and slot connections.

The pins 53 are preferably arranged in such a way that certain of the weights are moving inwardly while others are moving outwardly, thus effecting a more balanced or uniform distribution of the forces retarding the planetary movement and eliminating in large measure pulsations in operation.

The automatic operation of the transmission, briefly described, is as follows:

It will be assumed that the clutch and back-stop mechanisms 24 and 25 are in the forward drive positions shown in Figs. 1 to 4 inclusive, in which positions the ring gear 14 is prevented from turning backward and the spider 20 is connected with the driven shaft 12. When the driving shaft 10 is rotated, the sun gear 13 will act through the planet gears 18 and the spider 20 to cause the driven shaft 12 to rotate slowly in the same direction under a multiplication of torque. As the speed of the driving shaft 10 increases, the centrifugal force resisting the inward movement of the weights 23 will retard the planetary movement occurring between the sun gear 13, the planet gears 18 and the ring gear 14, with the result that the ring gear 14 will gradually be picked up by the planet gears 18 and caused to rotate in unison with the other elements of the planetary gearing and thus establish a unit drive. Should the load resistance increase beyond a certain amount, or the speed of the driving shaft decrease, the tendency of the planet gears 18 to rotate about their own axes will overcome the resistance offered by the weights 23 and planetary movement will be resumed, with a consequent multiplication of torque.

In order to place the transmission in reverse, the rod 37 is shifted forwardly in one manual operation, whereby to connect the ring gear 14 with the driven shaft and prevent the spider 20 from turning forward. When the driving shaft 10 is then rotated, the ring gear 14 will be rotated backward under a multiplication of torque.

In Figs. 5 to 9 inclusive are shown five different structural modifications of the closure members for the recesses in the ratchet wheels of the back-stop mechanism 25. In the modification shown in Fig. 5, the recesses 87 in the ratchet wheel 88 are adapted to be closed off by pivoted weight members 89 which are normally retracted into pockets 90 in the bottoms of the recesses 87 under the action of springs 91, which springs bear against lips 92 on the weight members. When the ratchet wheel 88 is rotated, the members 89 swing outwardly under centrifugal force into positions flush with the periphery of the ratchet wheel against the restraining action of the springs 91. In Fig. 6 the springs 93 which serve to retract the weight members 94 into the pockets 95 are located at the ends of the weight members rather than inwardly of the same. In Fig. 7, the weight members 96 are retracted into the pockets 97 in the bottoms of the recesses 98 by coil springs 99. In Fig. 8, the closure members are in the form of thin plates 100 which are hinged to pins 101 which extend crosswise in the pockets 102. In Fig. 9 the closure members are in the form of reciprocating blocks 103. The blocks carry stems 104 which extend inwardly and are encircled by springs 105 which bear against heads 106 on the stems. The springs 105 normally hold the blocks 103 retracted within the pockets 107. When the ratchet wheel is rotated, however, the centrifugal force acting on the blocks 103 will move the same out of the pockets 107 against the resistance of the springs 105 into positions wherein the blocks are flush with the periphery of the ratchet wheel.

Having thus described and shown an embodiment of our invention, what we claim and desire to secure by Letters Patent of the United States is:

1. In an automatic transmission, a driving shaft, a driven shaft, a planetary gear train, means for connecting one element of said train with said driving shaft, means for connecting either one of two other elements of said train with said driven shaft, means for holding either one of said last mentioned elements against rotation in one direction when the other is connected with said driven element, and means for gradually retarding the planetary movement in said train when the driving shaft is rotated.

2. In an automatic transmission, a driving shaft, a driven shaft, a planetary gear train connecting said shafts, ratchet wheels secured to two elements of said train, pawls for coacting with said ratchet wheels in different directions, means for placing either one of said pawls in operation and the other of said pawls out of operation, and means for closing off the teeth recesses in said ratchet wheels when the ratchet wheels are rotated.

3. In an automatic transmission, a driving shaft, a driven shaft, and a planetary gear train connecting said shafts, said train including a planet shaft, a planet gear secured to said planet shaft, a weight pivoted on said planet shaft, and a pin projecting radially from said planet shaft through a circumferentially elongated opening in the pivoting portion of said weight for permitting the weight to turn approximately 180° with respect to the shaft.

4. In an automatic transmission, a driving shaft, a driven shaft, a planetary gear train connecting said shafts, ratchet wheels secured to two elements of said train, a pivotally mounted member having two pawl portions for coaction with said ratchet wheels in different directions, means for moving said member into different positions to place either one of said pawls in operation and the other of said pawls out of operation, said pivotally mounted member being movable into a position wherein both pawl portions are out of operation when the particular ratchet wheel held against rotation in one direction commences to rotate in the other direction.

In testimony whereof we have hereunto subscribed our names.

KENNETH E. LYMAN.
ROGER B. McMULLEN, Jr.
ALBERT M. LANE.